United States Patent

Barsack et al.

[11] 4,221,463
[45] Sep. 9, 1980

[54] OPTICAL MODULATOR WITH RINGING SUPPRESSION

[75] Inventors: Edward Barsack, Auburndale; Arthur A. Chabot, Westford; Clarke E. Harris, Wayland; Donald A. Kawachi, Natick, all of Mass.; William A. Richardson, Nashua, N.H.

[73] Assignee: Raytheon Company, Lexington, Mass.

[21] Appl. No.: 38,352

[22] Filed: May 11, 1979

[51] Int. Cl.³ .............................................. G02F 1/03
[52] U.S. Cl. ..................................... 350/150; 350/149
[58] Field of Search ................ 350/149, 150, 355, 358

[56] References Cited

U.S. PATENT DOCUMENTS

| | | | |
|---|---|---|---|
| 2,753,763 | 7/1956 | Haines | 350/150 |
| 3,443,857 | 5/1969 | Warter | 350/150 |
| 3,572,897 | 3/1971 | Bousky | 350/150 |
| 3,653,743 | 4/1972 | Kiefer et al. | 350/150 |
| 3,663,091 | 5/1972 | Lee | 350/150 |

*Primary Examiner*—John K. Corbin
*Assistant Examiner*—R. A. Rosenberger
*Attorney, Agent, or Firm*—William R. Clark; Milton D. Bartlett; Joseph D. Pannone

[57] ABSTRACT

Ringing caused by acoustic resonances in an electro-optical crystal modulator and commencing at the trailing edge of a pulse may be suppressed by the combination of a second electro-optical crystal and a polarizer. The polarization of the ringing passing through the second crystal is rotated 90° by applying an appropriate voltage to the second crystal at the trailing edge of the pulse. The polarizer, properly oriented, then blocks the ringing. The crystals may comprise such materials as Cadmium Telluride or Gallium Arsenide.

13 Claims, 6 Drawing Figures

OPTICAL MODULATOR WITH RINGING SUPPRESSION

BACKGROUND OF THE INVENTION

The use of electro-optical materials such as, for example, Cadmium Telluride crystals, to modulate optical waves is now well known. For example, the changes in the index of refraction produced by changes in the magnitude of an electric field applied to the material through which the light to be modulated passes, can be used to produce changes in, among other things, the polarization of the light. One of many applications for this piezoelectric effect is an electro-optical modulator shutter. More specifically, light in one polarization from a CW laser oscillator may be directed through the crystal with an applied pulsed electric field to alternately rotate the direction of polarization of light passing through it. If the crystal output has a 90° polarization difference depending on whether the electric field is applied, and a polarizer having an orientation equal to one of the two possible outputs is positioned at the output of the crystal, the result is a series of pulses related to the waveform of the applied electric field. In many applications such as, for example, a system wherein the scattered light from radiated pulses is detected for doppler shift, the modulator shutter technique has advantages over a pulsed laser oscillator because the degree of coherence of the light is higher using a shutter. One characteristic of an electro-optical modulator is that the piezoelectric effect in the crystal resulting from the applied electric field causes an acoustic wave which continues in the crystal well after the electric field is removed. The result is an unwanted transmission through the crystal during the time the radiation is supposed to be completely blocked. This continued oscillation of the output is commonly referred to as ringing and it may exist in modulators other than the electro-optical type. In some applications such as, for example, laser radars, the ringing is very damaging because it continues during that time when signal returns of interest are received. A certain part of the ringing output is back-scattered from output optics and is combined with the returns.

Prior art attempts to suppress the ringing effect in electro-optic devices have involved utilizing electro-optic crystals of an irregular shape in order to alter the acoustic resonance characteristics of the crystal, mechanically clamping the crystal with sufficient pressure to prevent it from responding to an applied field at its resonant frequencies, and bonding the crystal to a material having high acoustic energy absorption properties. These schemes have not achieved sufficient ringing suppression for certain particular applications.

SUMMARY OF THE INVENTION

The invention discloses a first optical shutter which provides a pulsed laser output from a CW laser input and a second optical shutter which receives the pulsed laser output and blocks the passage of light at the trailing edge of the pulse. The second shutter is controlled by a control means that provides the blocking at the proper time. The control means may also control the first shutter. The optical shutters may comprise electro-optical modulator crystals and polarizers and it may be preferable that the crystals comprise Cadmium Telluride or Gallium Arsenide. The purpose of the second shutter is to suppress the ringing of the first shutter. Ringing may be defined as the leakage of light caused by oscillations of the shutter.

More specifically, a first shutter may comprise an electro-optical modulator crystal that rotates the polarization of propagating light by 90° when an appropriate voltage is applied to the crystal. The positioning of a first properly oriented polarizer at the output of such a crystal may result in a pulse output that is related to a voltage pulse applied to the crystal. The positioning of a similar second electro-optical modulator crystal to receive the output of the first polarizer may be used in combination with a second properly oriented polarizer to prevent ringing from the first crystal from propagating through the combination. More specifically, a control applies a voltage to the second crystal at the trailing edge of the voltage pulse applied to the first crystal. This causes the polarization of the ringing to be rotated by 90° and blocked by the second polarizer. The applied voltage may preferably be 8 kilovolts.

DESCRIPTION OF THE PREFERRED EMBODIMENT

Figure 1:
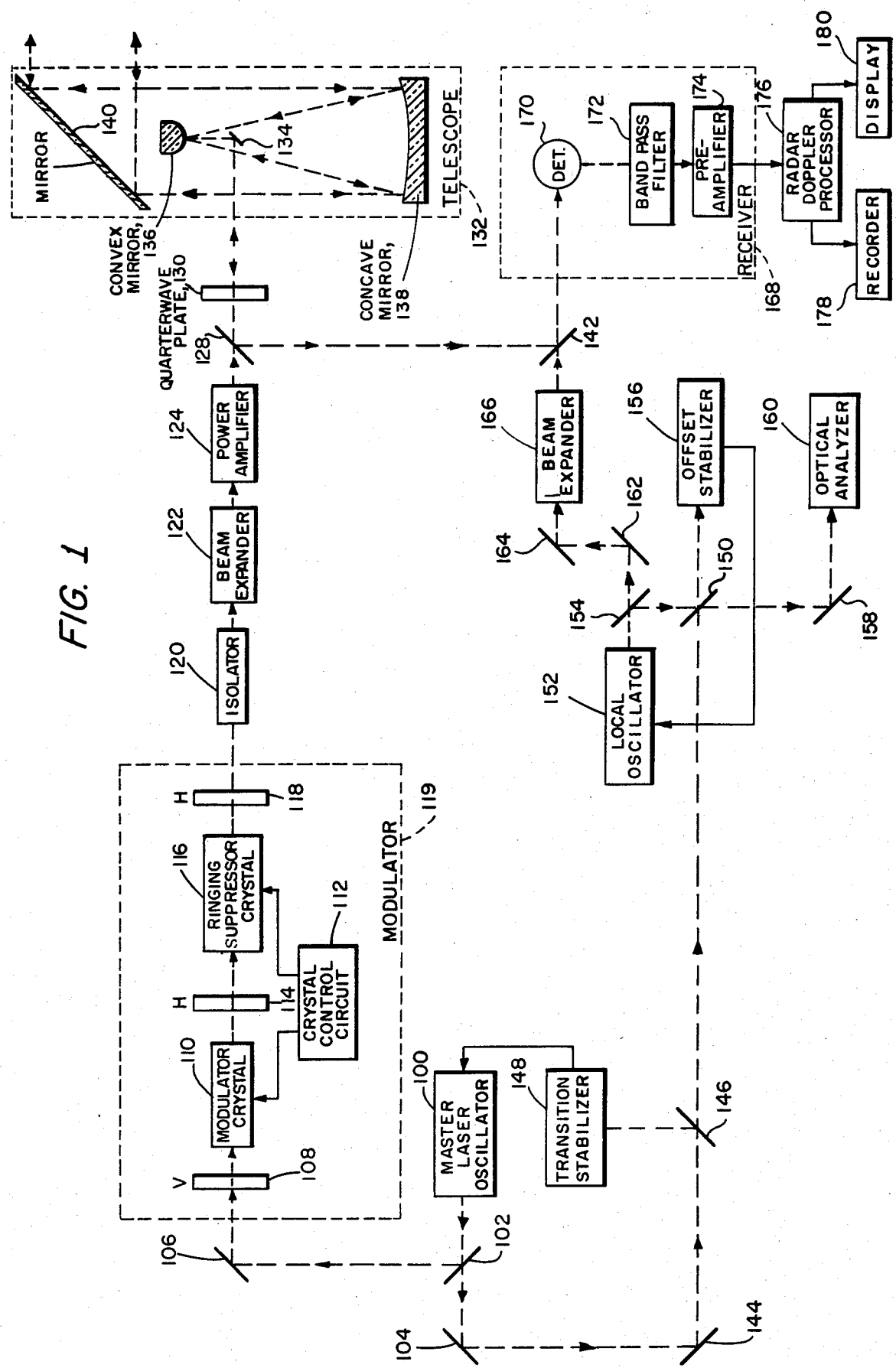
FIG. 1 is a functional block diagram of a laser CAT system embodying the invention.

Referring to FIG. 1, a bolck diagram of a system embodying the invention is shown. Specifically, the system is a laser radar used to detect clear air turbulence (CAT) which has been defined by the National Committee for Clean Air Turbulence (1966) as "all turbulence in the free atmosphere, of interest in aerospace operations, that is not in or adjacent to visible convective activity. This includes turbulence found in cirrus clouds not in or adjacent to visible convective activity". CAT thus generally considers all bumpy flight conditions away from convective clouds, as they affect airplanes, rockets, etc.

A master $CO_2$ laser oscillator 100, such as, for example, a Honeywell model 7000, emits CW, 10.6 micron radiation, a portion of which is used for the transmitter path and the remainder in connection with local oscillator 152. Although a range of laser wavelengths could be used, it was found that for the particular CAT application, the best results were obtained using 10.6 microns. Other preferably parameters for oscillator 100 used in the CAT application are output power in the range from 7 to 8 watts, $TEM_{oo}$ mode, a high degree of coherence substantially single wavelength mode, beam diameter of 4.5 millimeters at the $1/e^2$ points, and beam polarization of at least 1:100 assumed to be vertical for the discussion hereinafter. For other applications and systems, a different set of oscillators 100 parameters may be desirable.

Still referring to FIG. 1, oscillator 100 beam output is directed toward beam splitter 102 where a substantial portion of the energy on the order of 80% is reflected onto the transmitter path in the direction of mirror 106 as shown. The remainder of the energy incident on beam splitter 102 passes through and is reflected at mirror 104, a path which will be discussed later herein. The beam incident on mirror 106 is reflected into modulator 119, the design and operation of which will be described in detail hereinafter with reference to FIGS. 2, 3, 4A, 4B and 4C. Briefly here, however, the function of the modulator is to provide an optical shutter to convert the highly coherent CW output of the master laser oscillator to a train of pulses required for the operation of the CAT system. Although other configurations are immediately obvious to one skilled in the art, polarizer 108 is vertical, polarizer 114 is horizontal, and modulator crystal 110 positioned between them is fabricated of Cadmium Telluride (CdTe). When no voltage is applied to modulator crystal 110 from crystal control circuit 112, the light beam passing through modulator crystal 110 is unaltered in polarization and the combination of vertical polarizer 108 and horizontal polarizer 114 blocks all light from passing further down the transmitter path. When an appropriate voltage of approximately of 8 kilovolts is applied to modulator crystal 110 from crystal control circuit 112, it becomes birefringent and, in effect, becomes a half-wave plate causing the polarization of an incident linearly polarized light beam to be rotated by 90° at the output. Therefore, the beam output from modulator crystal 110 when the voltage is applied such that the input is rotated by 90° is horizontal and passes through horizontal polarizer 114. Accordingly, electrical voltage pulses applied to modulator crystal 110 produce optical pulses of horizontally polarized light at the output of horizontal polarizer 114, the shape of which, in principle, are identical to that of the electrical pulses. The purpose of ringing suppressor crystal 116 and horizontal polarizer 118 are to prevent the ringing effect output from modulator crystal 110 from being transmitted during the interpulse period when all radiation is to be blocked.

As shown in FIG. 1, the light beam output from modulator 119 is directed to isolator 120. Its function is to prevent amplified backscatter from a device such as telescope 132 from coupling back to master laser oscillator 100 where the frequency of the output energy may be pulled. The isolator, constructed in accordance with conventional free carrier Faraday isolator theory, comprises an indium antimonide (InSb) Faraday rotator (not shown) positioned between two linear polarizers (not shown) which have principal axes oriented 45° with respect to one another. A beam of linearly polarized light derived from master laser oscillator 100 passes through the front polarizer, is rotated 45° and transmitted through the rear polarizer. Maintaining its original polarization, backscattered radiation from optical components re-enters the isolator through the rear polarizer, is rotated an additional 45°, and is subsequently blocked by the front polarizer which after the two light rotations is orthogonal to the light polarization.

The beam output of isolator 120 is directed to beam expander 122, the function of which is to approximately double the diameter of the beam so as to efficiently use the available gain of the power amplifier tubes (not shown) of laser amplifier 124. The beam comprises conventional off-axis parabolic mirrors of different sizes.

Still referring to FIG. 1, the output beam of beam expander 122 is directed to power amplifier 124, the obvious function of which is amplify the input. The components therein are not shown. Any one of a plurality of commercially available laser amplifiers could be used. In the preferred embodiment, the power amplifier comprises six tubes, each with a ¾ meter discharge for a total active length of 4.5 meters. Each tube uses a three-electrode configuration with the two end electrodes at ground potential and the center electrode at approximately 10 kilovolts. The gas is fed at the tube center and exhausted at both ends to achieve a symmetrical flow. This symmetry makes the amplifiers less sensitive to gas flow rates, composition, pressure, and to discharge current and pulse repetition rate. The amplifier is pulse discharged, receiving its energy from an amplifier pulse modulator. During operation, the synchronizer provides a small voltage pulse of approximately 150 microsecond duration. This low level input pulse is amplified to about 250 volts and coupled to the grid of the HV modulator tube, a tetrode. The pulse fires the laser amplifier tubes and initates the discharge of the high voltage storage capacitor in series with both the modulator tube and the laser amplifier tubes. The result is that the capacitor storage bank provides the short duration high-energy pulse needed by the laser amplifier tubes, while the tetrode maintains a fairly constant current for the pulse duration. The overall gain of the power amplifier is approximately 36 dB.

Power amplifier 124 output is directed through beam splitter 128 to quarter-wave plate 130, the function of which is to produce a circularly polarized beam that is directed to telescope 132. The telescope is a twelve-inch diameter parabolic of cassegrainian configuration. The beam is sequentially reflected from mirror 134, convex mirror 36, concave mirror 138, and mirror 140 to free space.

Radiation backscattered from aerosols is received by the telescope and travels a reverse path from mirror 140, concave mirror 138, convex mirror 136, and mirror 134 to quarter-wave plate 130. Of special interest is backscattered radiation from aerosols with velocity that cause detectable doppler shift. Cadmium sulfide quarter-wave plate 130 linearly polarizes the beam making it orthogonal to the amplifier output. The returns are then directed to beam splitter 128 which is, more specifically, a germainium Brewster plate. Because the incident energy is orthogonal to the amplifier output, approximately 80% of the energy is reflected to recombining beam splitter 142 where it is combined with local oscillator 152 output, the derivation of which will now be described.

Again referring to beam splitter 102 of FIG. 1, that portion of the master laser oscillator 100 not directed in the transmitter path by beam splitter 102 is reflected from mirrors 104 and 144 to beam splitter 146. The beam splitter reflects a portion of the light beam to transition stabilizer 148 which is a commercially available device, such as, for example, a Lansing Research Company model 80214. Its purpose is to maintain the master laser oscillator 100 at the center of a given transition by sampling the output and providing a control signal as shown. The signal is coupled to a piezoelectric transducer at oscillator 100. In selecting a desired transition, optical analyzer 160 functions as a spectrometer to provide an analysis of all the transitions. As can be seen in FIG. 1, the master laser oscillator output at beam splitter 146 is directed to optical analyzer 160 by way of reflection from beam splitter 150 and mirror 158.

One portion of the output of local oscillator 152 is directed through beam splitter 154, reflected from mirrors 162 and 164, and is passed through beam expander 166 to recombining beam splitter 142 where it is combined with the return signal from beam splitter 128. The combined beams are then directed to detector 170. Because the radar doppler processor 176 analyzes the doppler shift of signals, local oscillator 152 provides an output that is locked to a frequency offset from master laser oscillator by a fixed amount, such as, for example, 10 MHz. The locking loop comprises offset stablizer 156, the operation of which is known by one skilled in the art. As can be seen in FIG. 1, beam splitter 150 combines the output of local oscillator 152 from beam splitter 154 and the output of master laser oscillator 100 from beam splitter 146. These two outputs are directed to offset stablizer 156 which determines a beat frequency of 10 MHz. Offset stabilizer 156 then provides a loop control signal to local oscillator 152 to provide the 10 MHz offset.

Many conventional type receivers could be used. In the preferred embodiment, receiver 168 comprises a detector 170, bandpass filter 172 and preamplifier 174. The heterodyne detector may also be selected from any one of a number of conventional types. For example, a HgCdTe photovoltaic detector using nitrogen cooling may be used. The bandpass filter 172 rejects all frequencies not in the bandwidth of interest. The preamplifier 174 provides amplification for the signals.

The receiver output is coupled to a conventional doppler radar processor 176 which provides the information in appropriate range and velocity bins for display 180, recorder 178, and analysis. Radar doppler processor 176 preferably comprises five prefilter amplifiers, mixers, local oscillators, and driver amplifier feeding to five groups of sixteen comb-filter amplifiers and detectors. Briefly, the 5–15 MHz signal is divided into five 2-MHz channels by the prefilters with each 2-MHz section of the original signal spectrum heterodyned to a common 2–4 MHz spectrum. The narrowband comb filters then divide each of these 2-MHz bands into the proper number of channels depending on the transmitted pulse width such as sixteen 125-KHz bands, eight 250-KHz bands or four 500 KHz bands. Thus, the entire 5 to 15 MHz band is divided into 80, 40, or 20 narrow bands.

Figure 2:
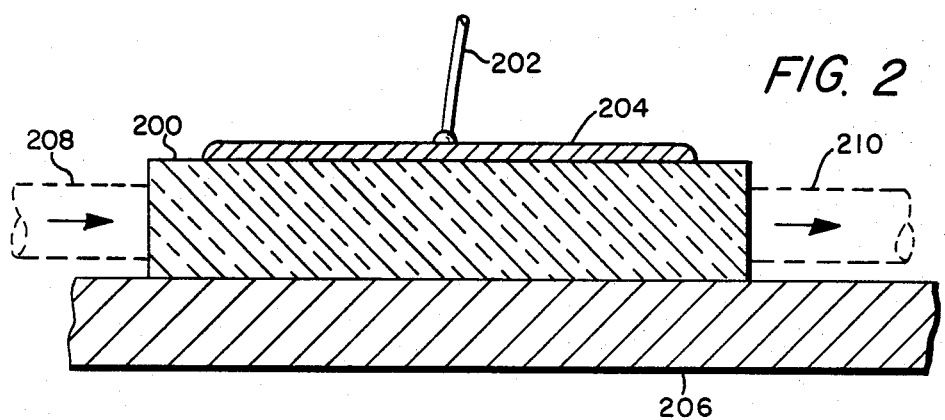
FIG. 2 is a fragmented side elevation view of a crystal modulator including top and bottom electrodes and lead wire.
Figure 3:
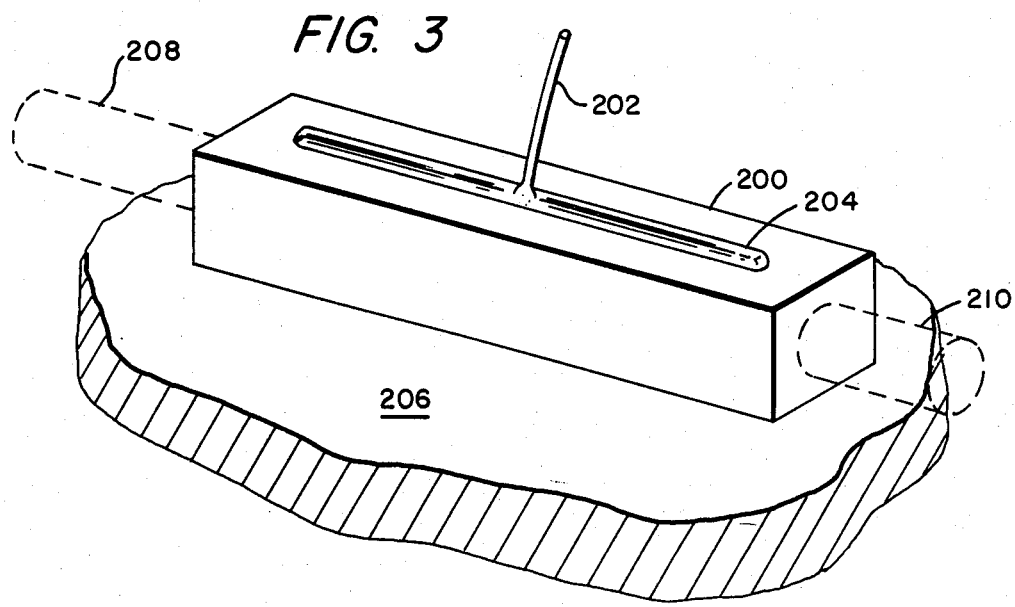
FIG. 3 is a fragmented isometric view of a crystal modulator including top and bottom electrodes and lead wire.

Referring respectively to FIGS. 2 and 3, fragmented side elevation and isometric views of a crystal 200 with electrodes 204 and 206 and lead wire 202 are shown. The description which follows is applicable to both modulator crystal 110 and ringing suppression crystal 116 of modulator 119 in FIG. 1. For the particular system of the preferred embodiment, it is preferable that the crystal consist of Cadmium Telluride (CdTe) and have dimensions of 8×8×50 millimeters. While, a Galluim Arsenide (GaAs) crystal having dimensions of 6×6×70 millimeters could have been used, it was found that with an incident light beam having a diameter of 6 or 7 millimeters, beam clipping occurred because of limited crystal aperture. To increase the aperture of the GaAs crystal, the length also would have to have been increased to operate with the same power supply voltage. Accordingly, with a CdTe crystal having approximately twice the electro-optical coeffiecent, the aperture could be 8×8 millimeters using the same power supply producing approximately 8 kilovolts. This voltage in the present system is sufficient to produce half-wave rotation or polarization rotation of 90°.

In operation, voltage pulses are applied between top electrode 204 and bottom electrode 206. The source of the pulses is crystal control circuit 112 as shown in FIG. 1 and the connection is lead wire 202. For the application of the preferred embodiment, the magnitude of the pulses is approximately 8 kilovolts, the pulse widths are in the range from 2 to 10 microseconds, and the pulse rate is in the range from 1 to 200 pulses per second. It is noted that for different applications, different pulse parameters may be preferable. Crystal control circuit comprises a pulse generator (not shown) and high voltage tubes (not shown).

Figure 4A:
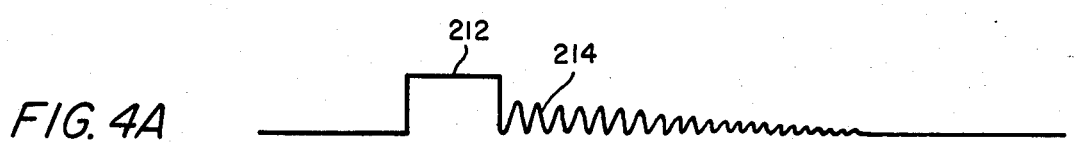
FIG. 4A is a crystal modulator output waveform showing the response of light rotated 90° in polarization from a CW laser input resulting from an applied voltage pulse to the crystal.
Figure 4B:
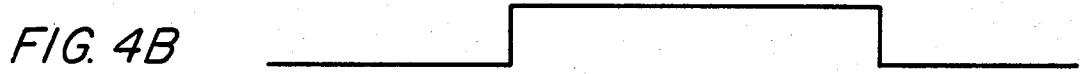
FIG. 4B is a voltage waveform applied to a ringing suppressor crystal.
Figure 4C:
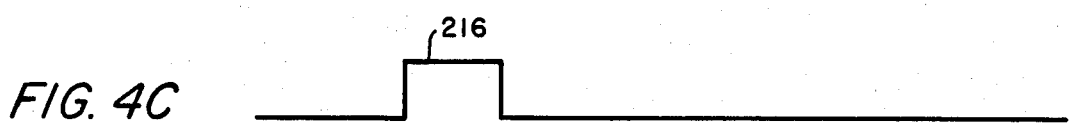
FIG. 4C is a waveform showing the output from the modulator when the waveform of FIG. 4B is applied to the ringing suppressor crystal at the trailing edge of the pulse input of FIG. 4A.

As described briefly herein earlier, when an appropriate voltage is applied to the crystal, the output light beam 210 is rotated 90° from the input light beam 208. The high voltage compresses the crystal and the index of refraction changes due to changes in stress within the crystal. In the process of restoring to its originnal dimensions after the high voltage is removed, acoustical resonances are excited in the crystal. These resonances cause a light beam propagating through the crystal to be modulate at the frequency of the resonances. This effect, known as ringing, often persists for as long as a millisecond. Referring to FIG. 4A, the crystal output light beam 210 of the rotated polarization is shown as a pulse 212 corresponding to the applied high voltage pulse and the exponentially damped ringing 214 caused by the acoustical resonances. It should be noted that the figure is not drawn to scale. In fact, the ringing is characteristically at least two orders of magnitude less than the pulse. Because the signal represented in FIG. 4A is horizontally polarized light, it all passes horizontal polarizer 114 as shown in FIG. 1 and is presented as an input to ringing suppressor crystal 116. FIG 4B shows the timing of the electrical pulse applied to ringing suppressor crystal. It is noted that it commences at the end of pulse 212 and continues for as long as significant echo returns are received by the system. This is typically 200 microseconds. During this time period, the horizontally polarized ringing 214 is rotated by 90° in ringing suppressor crystal 116 and thus becomes vertically polarized. The ringing as rotated is therefore blocked by horizontal polarizer 118 and results in a wave shape as shown in FIG. 4C which is directed towards isolator 120. If the exponentially damped ringing were not eliminated from the signal propagating down the transmitter path, backscattering of it from components such as the telescope, it would be present during the time that return signals of interest are being received from free space. The many harmonies and modulation of the exponential damping of the ringing would cause broadband high level interference during processing.

This completes the description of the preferred embodiment. However, many modifications thereof will be apparent to persons skilled in the art without departing from the spirit and scope of this invention. For example, the electro-optical modulator crystals could comprise any one of a number of materials other than the Cadmium Telluride or Gallium Arsenide as discussed. Further, any one of a number of pulse widths, pulse repetition rates may be preferable for various applications. Also, the size of the crystals and corresponding applied voltage may be varied. Also, types and locations of polarizers could be varied. Furthermore, the converting of a CW to pulsed laser could be provided by modulators other than electro-optical; an example is a mechanical modulator. In fact, the pulsed beam could be generated by a pulsed laser instead of a modulator; in such case, the ringing suppressor crystal would still be used to eliminate the harmful effects of ringing. Finally, the waveform of the voltage applied to the ringing suppressor crystal could be such that the rise and fall time is gradual so that acoustic resonances are not excited. Accordingly, it is desired that this invention not be limited by the particular details illustrated herein except as defined by the appended claims.

We claim:

1. In combination:
   a first optical shutter providing a pulsed laser output from a CW laser input;
   a second optical shutter positioned to receive the output of said first shutter;
   means for blocking the passage of light through said second shutter substantially at the trailing edge of an output pulse from said first shutter, said blocking means comprising control means for said second shutter.

2. The combination in accordance with claim 1 wherein said blocking means comprises control means for said first shutter.

3. The combination in accordance with claim 1 wherein said first and second optical shutters comprise electro-optical modulator crystals and polarizers.

4. The combination in accordance with claim 3 wherein said crystals comprise Cadmium Telluride.

5. The combination in accordance with claim 4 wherein said crystals comprise Gallium Arsenide.

6. In combination:
   a first electro-optical modulator crystal providing, for a linear CW laser input having a given polarization, a laser output having a first polarization the same as said given polarization when no voltage is applied to said crystal and a second polarization rotated 90° from said given polarization when an appropriate voltage is applied to said crystal;
   a first polarizer positioned to receive the output of said first crystal, said first polarizer passing only said second polarization;
   a second electro-optical modulator crystal positioned to receive the output of said first polarizer, said second crystal providing a laser output having the same polarization as its input when no voltage is applied to said second crystal and a laser output having a polarization rotated 90° from its input when an appropriate voltage is applied to said second crystal;
   a second polarizer positioned to receive the output of said second crystal, said second polarizer passing only said second polarization; and
   means for applying a pulse of said appropriate voltage to said first and second crystals, said applying means adapted for providing said pulse to said second crystal at the trailing edge of a said pulse applied to said first crystal.

7. The combination in accordance with claim 6 wherein said crystal comprises Cadmium Telluride.

8. The combination in accordance with claim 6 wherein said crystal comprises Gallium Arsenide.

9. The combination in accordance with claim 6 wherein said voltage is approximately 8 kilovolts.

10. In combination:
    a first electro-optical modulator crystal providing, for a linear CW laser input having a given polarization, a laser output having a first polarization the same as said given polarization when no voltage is applied to said crystal and a second polarization rotated 90° from said given polarization when an appropriate voltage is applied to said crystal;
    a first polarizer positioned to receive the output of said first crystal, said first polarizer passing only said given polarization;
    a second electro-optical modulator crystal positioned to receive the output of said first polarizer, said second crystal providing a laser output having the same polarization as its input when no voltage is applied to said second crystal and a laser output having a polarization rotated 90° from its input when an appropriate voltage is applied to said second crystal;
    a second polarizer positioned to receive the output of said second crystal, said second polarizer passing only said given polarization; and
    means for applying a pulse of said appropriate voltage to said first and second crystals, said applying means adapted for providing said pulse to said second crystal at the trailing edge of a said pulse applied to said first crystal.

11. The combination in accordance with claim 10 wherein said crystal comprises Cadmium Telluride.

12. The combination in accordance with claim 10 wherein said crystal comprises Gallium Arsenide.

13. The combination in accordance with claim 10 wherein said voltage is approximately 8 kilovolts.

* * * * *

UNITED STATES PATENT OFFICE
CERTIFICATE OF CORRECTION

Patent No. 4,221,463　　　　　　　　Dated September 9, 1980

Inventor(s) Barsack, et al.

It is certified that error appears in the above-identified patent and that said Letters Patent are hereby corrected as shown below:

Column 2, line 6: change "volatage" to --voltage--;

Column 2, line 63: change "preferably" to --preferable--;

Column 4, line 25: change "initates" to --initiates--;

Column 4, line 39: change "36" to --136--;

Column 5, line 68  change "coeffiecent" to --coefficient--;

Column 6, line 26: change "modulate" to --modulated--.

Signed and Sealed this

Fourteenth Day of April 1981

[SEAL]

Attest:

RENE D. TEGTMEYER

Attesting Officer　　　Acting Commissioner of Patents and Trademarks